United States Patent [19]
Kakuta et al.

[11] Patent Number: 5,457,703
[45] Date of Patent: Oct. 10, 1995

[54] ARRAY DISK SYSTEM AND CONTROL METHOD THEREOF

[75] Inventors: Hitoshi Kakuta, Kokubunji; Yoshihisa Kamo, Musashimurayama, both of Japan

[73] Assignee: Hitachi, Ltd., Tokyo, Japan

[21] Appl. No.: 793,110

[22] Filed: Nov. 18, 1991

[30] Foreign Application Priority Data

Nov. 21, 1990 [JP] Japan ................... 2-314276

[51] Int. Cl.$^6$ ............... G06F 11/10; G06F 11/18
[52] U.S. Cl. ........................................... 371/40.4
[58] Field of Search ................. 371/40.1, 51.1, 371/10.2, 40.4; 360/48

[56] References Cited

U.S. PATENT DOCUMENTS

| | | | |
|---|---|---|---|
| 4,432,025 | 2/1984 | Grogan | 360/48 |
| 4,814,903 | 3/1989 | Kulakowski et al. | 360/48 |
| 4,858,034 | 8/1989 | Hassel et al. | 360/51 |
| 4,993,030 | 2/1991 | Krakauer et al. | 371/40.1 |
| 5,111,345 | 5/1992 | Muller | 360/48 |

*Primary Examiner*—Stephen M. Baker
*Attorney, Agent, or Firm*—Antonelli, Terry, Stout & Kraus

[57] ABSTRACT

An array disk system includes a plurality of disk drives having disk-like recording media each having a surface divided into a plurality of zones and the data capacity per track is varied in each zone. The plurality of disk drives are divided into a plurality of groups. Reading/writing heads of the disk drives are positioned to access tracks having different zones on the disks in each zone on the basis of a cylinder address designated by a host system. Data transferred from the host system is divided in accordance with a ratio of data capacities of the tracks to be accessed and is recorded in each of the disk drives simultaneously.

13 Claims, 14 Drawing Sheets

PROCESSED DATA AMOUNT IN SINGLE PARALLEL PROCESSING IN ARRAY DISK (IN SAME TIME)

FIG. 8
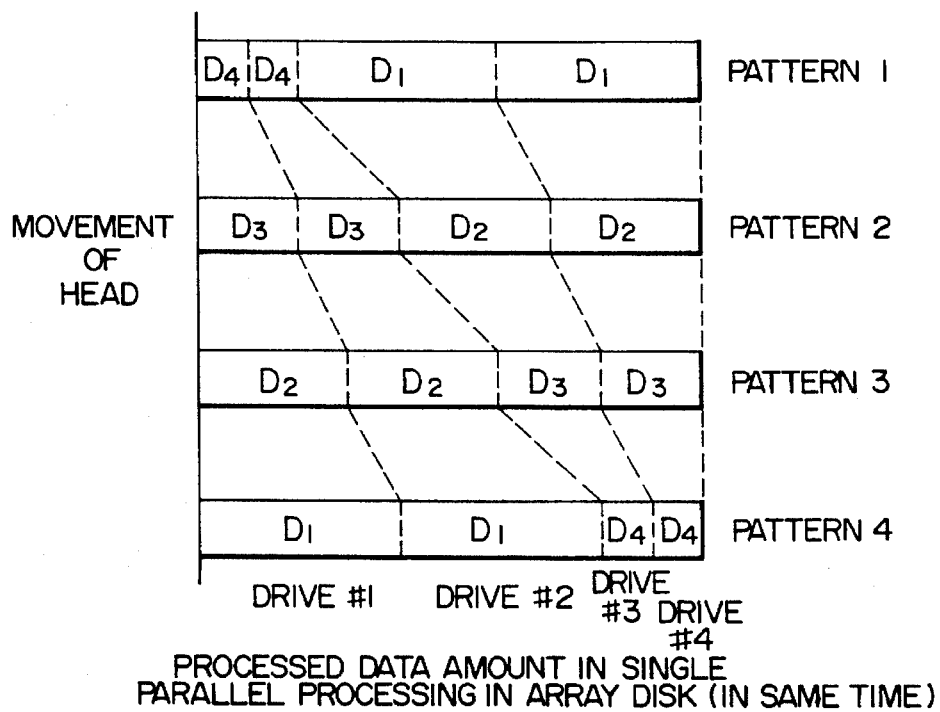
PROCESSED DATA AMOUNT IN SINGLE
PARALLEL PROCESSING IN ARRAY DISK (IN SAME TIME)
FIG. 9
PATTERN 1
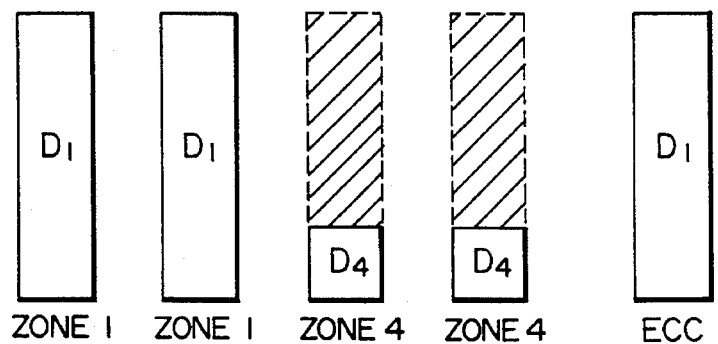
PATTERN 2
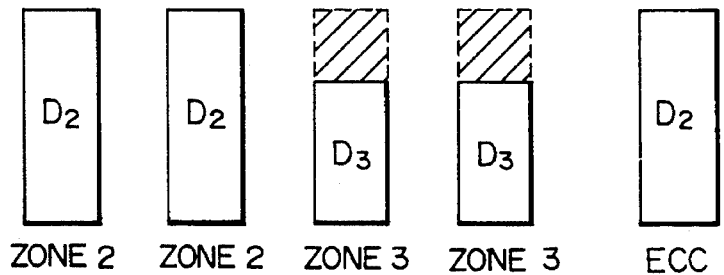

PATTERN 1

PATTERN 2

FIG. 13A
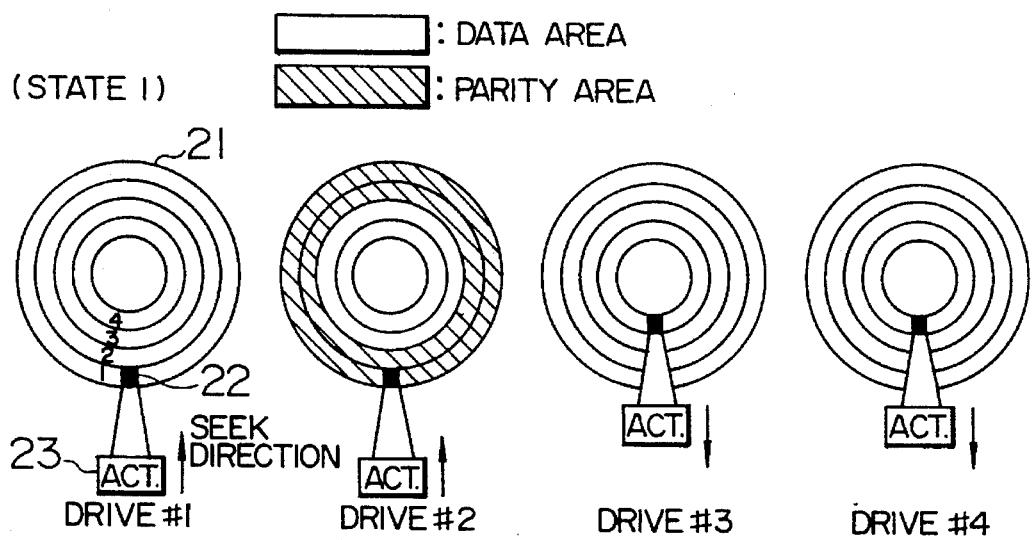
(STATE 1)
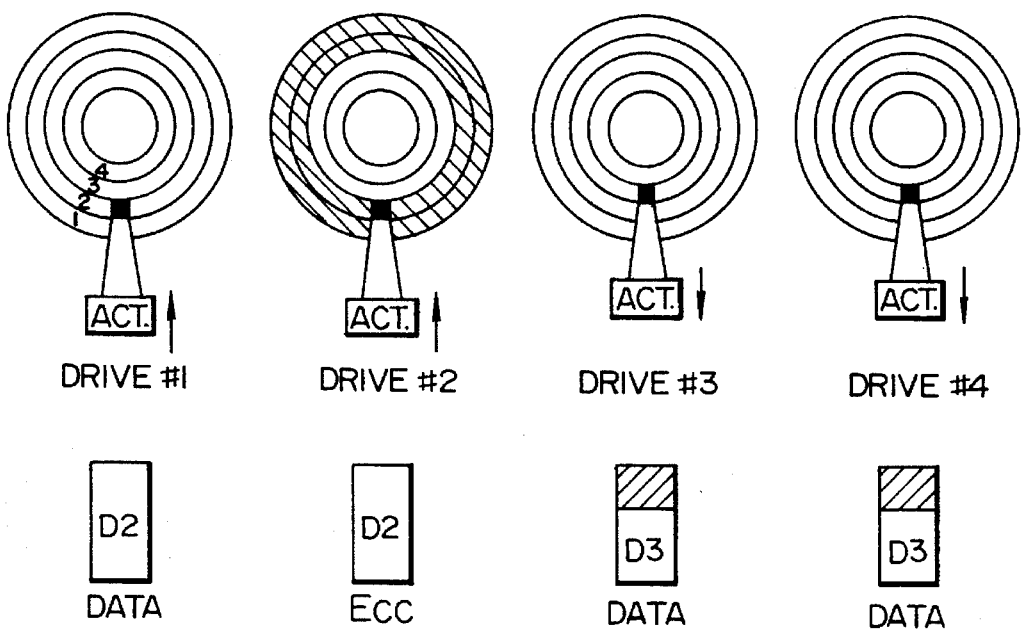
(STATE 2)

FIG. 13B
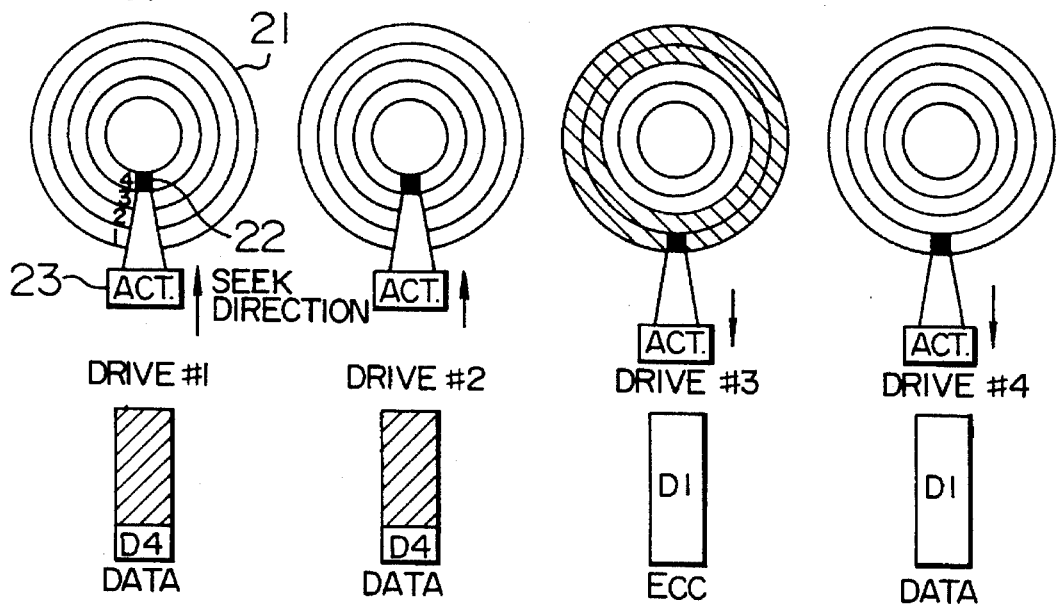
(STATE 3)
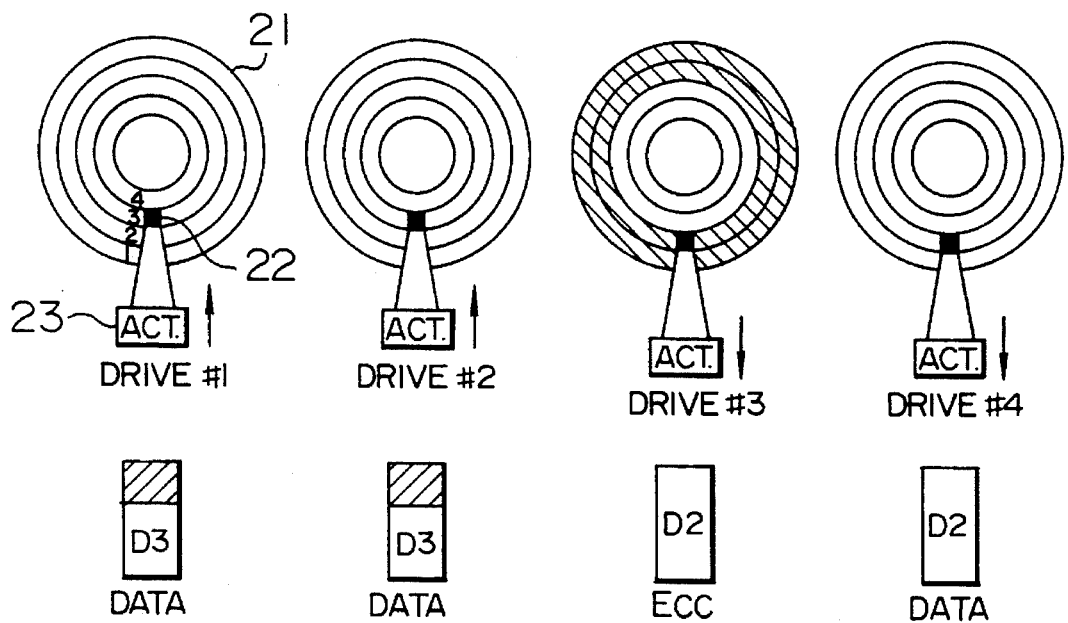
(STATE 4)

ARRAY DISK SYSTEM AND CONTROL METHOD THEREOF

BACKGROUND OF THE INVENTION

The present invention relates to a disk file apparatus for use in an information processing unit of a computer, and more particularly to an array disk system using a plurality of disk drives in which a recording surface of a disk is divided into a plurality of zones and the data capacity per track is varied in each zone to record information.

In an information processing apparatus of a computer, currently, data required by a host system, such as a central processing unit (CPU), is stored in a secondary storage system, and writing and reading of the data to the secondary storage system are carried out in response to a request of the CPU. The secondary storage system generally employs a nonvolatile storage. Representatives of the secondary storage system include a magnetic disk drive, an optical disk drive and the like.

Recently, with development of the high degree information system, high performance for the processing speed of the secondary storage system is required. As a method of improving the processing capability of a system using a magnetic disk drive, for example, there is an array disk system composed of a multiplicity of magnetic disk drives having relatively small capacity, as will be described below. The array disk system divides data transferred from a CPU and records the divided data in a plurality of magnetic disk drives simultaneously. When the recorded data is read from the magnetic disk drives, parallel processing is performed in which data recorded in each of the magnetic disk drives is read simultaneously and original data is reproduced from the data read out of the magnetic disk drives to be transferred to the CPU. In the parallel processing of the plurality of magnetic disk drives, disks constituting recording media of the magnetic disk drives are rotated in synchronism with one another in each group of magnetic disk drives which operate in parallel and the magnetic disk drives in the group are accessed using the same address. Thus, the plurality of magnetic disk drives perform the same operation.

A representative paper relating to the array disk system is "A CASE FOR REDUNDANT ARRAYS OF INEXPENSIVE DISKS (RAID)" by D. Patterson, G. Gibson and R. H. Kartz in ACM SIGMOD Conference, Chicago, Ill., June 1988. This paper reports a result of a study about performance and reliability of a one array disk system in which data of a processing unit at one time is divided and processed in parallel and an array disk system in which individual data is dispersed without dividing the data, which is treated independently. At present, the array disk system described in this paper is considered to be most popular.

In the array disk system, in order to improve the system reliability, when data is recorded, an error correction code (hereinafter abbreviated to as ECC) is generated from the divided data and the ECC is recorded in a magnetic disk drive for storing the ECC (hereinafter referred to as an ECC drive) concurrently with recording of the data. By generating the ECC as described above, when a failure occurs in one disk drive of the grouped magnetic disk drives in which the divided data is recorded and data can not be read out of the disk drive, the data recorded in the magnetic disk drive in which the failure occurs can be reconstructed on the basis of data recorded in the remaining magnetic disk drives and the ECC.

In the disk drives used in the array disk system which performs parallel processing, data is recorded in concentric tracks on the surfaces of a plurality of disks in the same manner as a conventional disk drive. Reading and writing of data in tracks on the disk surfaces are performed by reading/writing heads each provided in correspondence to a respective one of the disk surfaces, and positioning of all of the reading/writing heads to the tracks is performed simultaneously. A collection of tracks capable of being accessed by a single positioning is referred to as a cylinder and a cylinder address is commonly given to each of the cylinders from an outer periphery toward an inner periphery of the disk. Further, the capacity of data recorded in each of the tracks is the same for all of the tracks. Accordingly, in the magnetic disk drives constituting the array disk system, even if any track in any cylinder is accessed, the same capacity of data can be treated at the same time.

When parallel processing is performed in an array disk system using the type of disk drives which are commonly used at present, the physical addresses of data recorded in each of the disk drives constituting the array disk system are all identical. Thus, the disk drives are rotated in synchronism with one another and the same access instruction is issued to the disk drives, so that the reading/writing heads are caused to seek in the same direction and the same address of all of the disk drives is adapted to be always accessed simultaneously. Thus, the array disk system controls the plurality of disk drives as if a single disk drive is being used.

SUMMARY OF THE INVENTION

The length of a track at the inner periphery is different from that of the track at the outer periphery on the disk surface. Accordingly, in the disk drive in which the capacity of data recorded in each of the tracks is identical in all of the tracks on the disk surface as described above, the recording density of data in the track on the disk surface is reduced as the track approaches the outer periphery.

Recently, however, the demand for use of a large capacity disk drive has increased and there has been developed a technique in which the disk surface is divided into a plurality of zones, as shown in FIG. 5, and the capacity of data to be recorded in a track is identical within a zone and is different for each of the zones. By application of such a technique, the recording density (line density) in the direction of the track in each of the tracks on the disk is made substantially identical, so that the memory capacity per disk can be increased without reduction of the recording density in the outer periphery of the disk. Accordingly, there can be realized a disk drive having a large capacity (memory capacity) of data which can be recorded therein as compared with the case where the capacity of data to be recorded in all of the tracks on the disk surface is fixed.

In order to further increase the memory capacity of the array disk system, it is considered that a disk drive in which the disk surface is divided into a plurality of zones and the data capacity per track is varied in each zone is applied to the disk drive constituting the array disk system. However, when the disk drive, in which the disk surface is divided into a plurality of zones and the data capacity per track in each zone is varied to record data, is applied to the array disk system, there are problems as follows:

When parallel processing is performed in the array disk system, the plurality of disk drives constituting the array disk system are controlled as if a single disk drive is being used, as described above. In the disk drives constituting the array disk system, for example, the same address is assigned to a cylinder located in the same position physically. The reading/writing heads of the disk drives are caused to access the same cylinder position simultaneously when data is recorded or reproduced. Since the data capacity per track is smaller in the zone at the inner periphery of the disk, when recording in the disk is made by varying the data capacity per track in each zone, the amount of data capable of being recorded at the same time (data processing speed) is different depending on the zone to be accessed when the disk drives access the same zone (cylinder). More particularly, there occurs a problem that the time required for reading/writing of data is increased as the inner periphery of the disk is approached when the same amount of data is processed.

For example, when the radii of the outer and inner peripheries of the disk are $ro$ and $ri$, respectively, and the line density is $c$, the ratio of amounts of data capable of being processed in a fixed time is given by:

Data amount at outer periphery/Data amount at inner periphery =

$$(2 \times ro \times \pi \times c)/(2 \times ri \times \pi \times c) = ro/ri$$

Accordingly, when the access is concentrated at the inner periphery of the disk, the processing performance of the disk drive is reduced greatly.

Further, when the processing speed is different depending on the zone to be accessed, as described above, a processing circuit for the outermost zone having the highest processing speed must be provided.

Since the array disk system treats the plurality of disk drives logically as a single disk drive, when four disk drives, for example, are used, four tracks of the four disk drives, one for each of the four disk drives, are treated as one track. Thus, when the memory capacity is varied for each zone, the capacity of data to be recorded in the track is different depending on the zone being accessed, as shown in FIG. 15B. In an operating system used in a general purpose large computer system, generally, it is supposed that the capacity of data recorded in each of the tracks of the disk drives is always fixed. Therefore, when the capacity of data recorded in the track is different depending on the zone to be accessed, a countermeasure for modifying the operating system is required. This modification of the operating system requires a very large amount of work and can not be carried out easily.

It is an object of the present invention to solve the above problems, in the case where disk drives having a system in which a disk surface is divided into a plurality of zones and where the recording density in the direction of track is varied for each zone to record data applied to the array disk system and to provide an array disk system capable of utilizing an operating system of a general purpose large computer which is designed on condition that the recording density is fixed.

In order to achieve this object, the array disk system according to the present invention comprises a plurality of disk drives in which a disk surface is divided into a plurality of zones and the data capacity per track is varied for each zone to record data, and for example a zone in which a reading/writing head is positioned and the direction of the seek operation that the reading/writing head is moved are different depending on the disk drives or groups of the disk drives. Preferably, the data capacity per track in each zone is set so that the sum total of the data capacity of the tracks of the zones in which the respective reading/writing heads of the plurality of data storing disk drives are positioned is always fixed regardless of the position of the zones accessed by the reading/writing heads.

Positioning of the reading/writing head by the cylinder address is carried out so that the zone accessed by the head actually in respect to the same cylinder address specified by the host system is different depending on the disk drives or groups of the disk drives. Setting of access by the reading/writing head to each of the zones is preferably made by translating the cylinder address specified by the host system.

The direction of the seek operation of the reading/writing head involves both of one direction of advancing from the outer periphery to the inner periphery and the other direction of advancing from the inner periphery to the outer periphery in the radial directions of the disk.

In such an array disk system, division of data to be read and written in parallel in each of the disk drives is preferably made in accordance with a ratio of amounts of data capable of being processed in the same time.

Further, in the array disk system, an ECC is generated to match the length of the longest data of data processed by each of the disk drives. When the ECC is generated to match the length of the longest data of data processed by each of the disk drives, a difference in length between the data processed by the disk drives and the longest data is preferably filled with a certain bit pattern so that the length of each of the data is equal to the length of the longest data.

In the system in which the disk surface is divided into the plurality of zones and the data capacity per track in each zone is varied to record data, the data capacity per track in each of the zones is proportional to the radius thereof. Thus, the data capacity per track in the zone is increased as the zone approaches the outer periphery and it is decreased as the zone approaches the inner periphery. Accordingly, the zone in which the reading/writing head is positioned and the direction of the seek operation that the reading/writing head is moved in response to the cylinder address are different for each of the disk drives or each of the groups of the disk drives, so that a difference of the access time by the address specified by the host system can be made small. Further, by setting the data capacity per track in each zone so that the sum total of the data capacity per track of the zones in which the respective reading/writing heads of the plurality of data storing disk drives are positioned is fixed regardless of the position of the reading/writing heads, an amount of data processed by the whole array disk system at one time can be fixed regardless of the position of the reading/writing heads.

Consequently, the conventional operating system of a general purpose large computer can be used as it is without reduction of the processing performance of the array disk system.

As described above, in the present invention, the zone that the reading/writing head is positioned is set to be different depending on the disk drives, for example, so that a parallel processing of data is performed. Accordingly, division of data for the parallel processing of data is performed in accordance with a ratio of the amounts of data capable of being processed at the same time in the zones in which the reading/writing heads of the disk drives are positioned, so that the data capacity per track is always fixed regardless of the position of the reading/writing heads and the conventional operating system of the general purpose large computer can be used as it is.

BRIEF DESCRIPTION OF THE DRAWINGS

FIG. 8 schematically illustrates variation of data amount by position of a reading/writing head of the present invention;

FIG. 9 schematically illustrates division patterns of data in the first embodiment;

FIGS. 13A and 13B schematically illustrate seek operation and data recording in the second embodiment;

DESCRIPTION OF THE PREFERRED EMBODIMENTS

Figure 1:
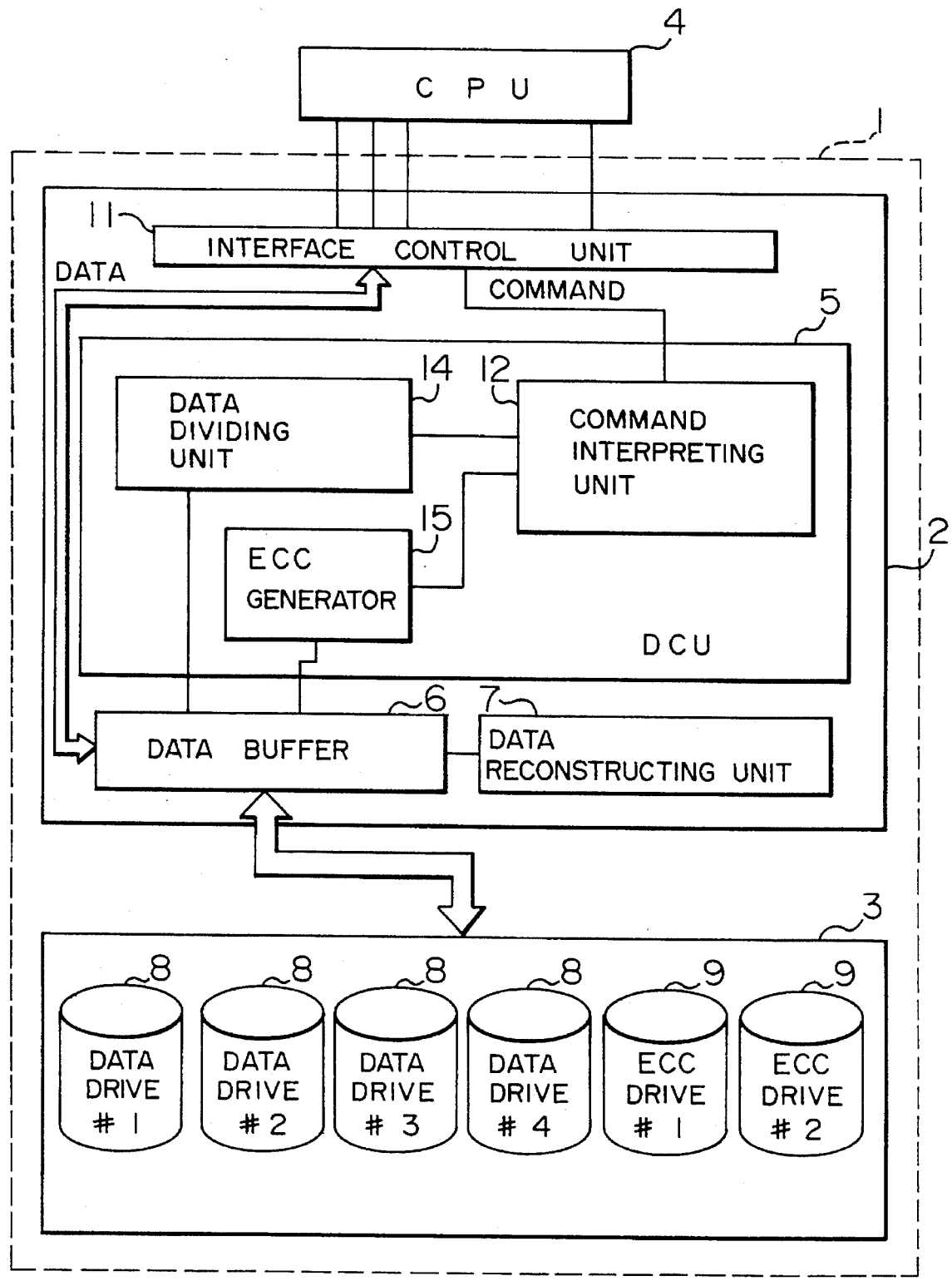
FIG. 1 is a block diagram showing a configuration of a first embodiment of the present invention.

FIG. 1 is a block diagram showing a configuration of an array disk system according to an embodiment of the present invention.

Numeral 1 denotes an array disk system including an array disk controller 2 and an array disk unit 3. Numeral 4 denotes a CPU which is a host system of the array disk system 1. Further, the array disk controller 2 includes a data control unit (DCU) 5 having a command interpreting unit 12, a data dividing unit 14 and an ECC generator 15, a data buffer (DB) 6, a data reconstructing unit 7 and an interface control unit 11 for performing input and output data request operations and data communication between the CPU 4 and the array disk controller 2. The array disk unit 3 includes a plurality of data storing disk drives (hereinafter referred to as data drives) 8 and ECC storing disk drives (hereinafter referred to as ECC drives) 9.

Figure 2:
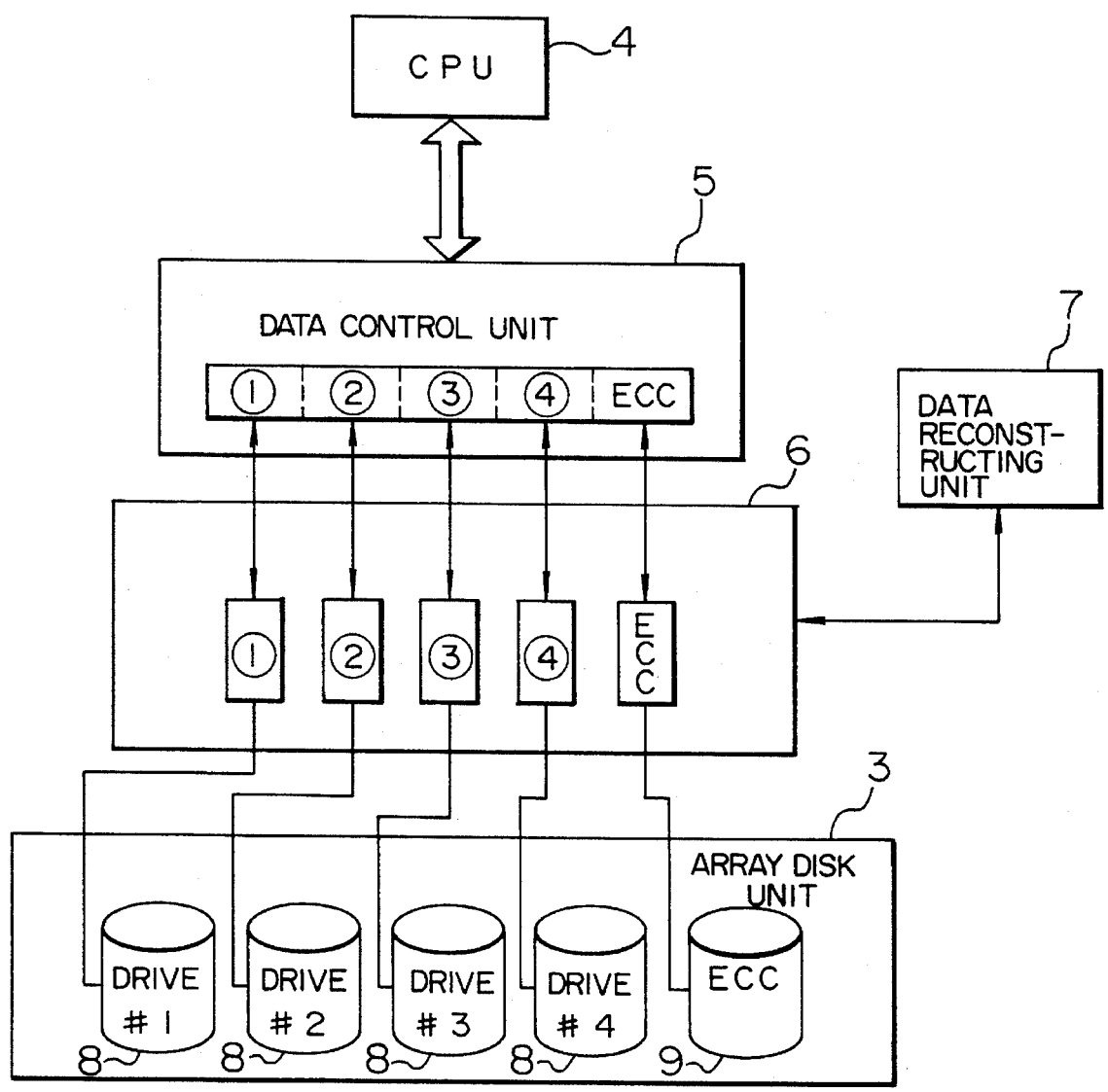
FIG. 2 schematically illustrates the state of data transfer in the first embodiment of the present invention.

Data transferred from the CPU 4 is, as shown in FIG. 2, divided into, for example, data ①, ②, ③ and ④ having a predetermined data length under control of the data dividing unit 14. The ECC generator 15 generates an ECC from the four divided data. The four divided data and the ECC are once first stored in the data buffer 6 and then stored in the data drives 8 and the ECC drive 9 under control of the command interpreting unit 12. As described later, any one of the ECC drives 9 is used in one reading/writing operation in the embodiment and accordingly FIG. 2 shows only one ECC drive 9.

Figure 3:
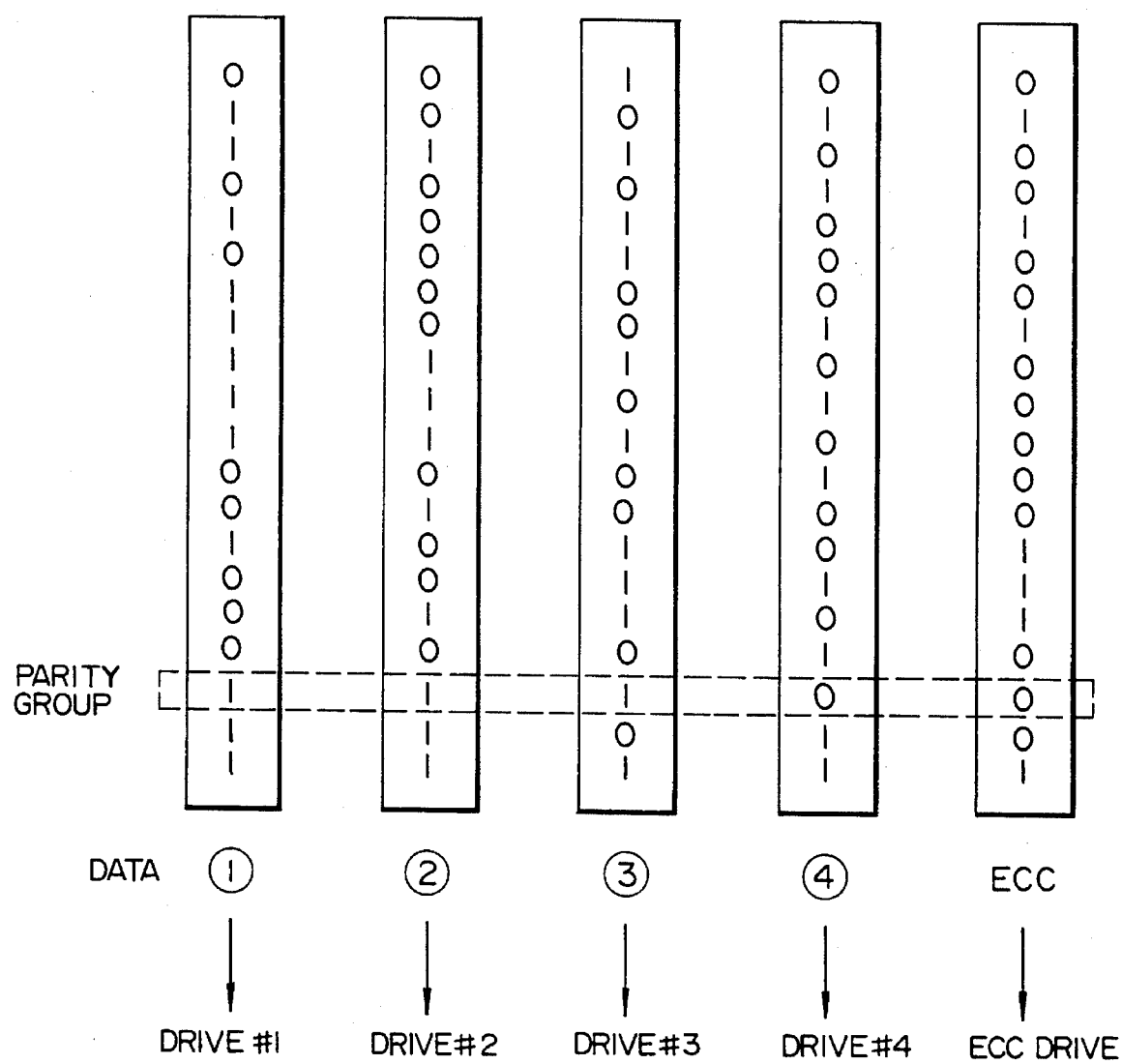
FIG. 3 schematically illustrates a method of generating an ECC.

In the embodiment, as shown in Fig, 3, the ECC is composed of parity bits produced for groups (parity groups) each including corresponding bits of the divided data ①, ②, ③ and ④. In the example of FIG. 3, the ECC is generated so that the number of 1 bits in the parity group is odd. That is, when the number of 1 bits in the corresponding bits of the data ①, ②, ③ and ④ is odd, the ECC is "0", while when it is even, the ECC is "1". By producing the ECC and storing it in the ECC drive 9, when the number of 1 bits in the parity group constituted of the corresponding bits of the data ①, ②, ③ and ④ read from the data drives 8 upon reproduction of data and the ECC read from the ECC drive 9 is not odd, it can be detected that there is an error in the bits in the parity group and a failure in any of the data drives 8 or the ECC drive 9 in the array disk unit 3 occurs.

When data is read from the array disk system 1, the data ①, ②, ③ and ④ and the ECC are read from the data drives 8 and the ECC drive 9, respectively, and are stored first in the data buffer 6 conversely to the transfer of data from the CPU 4. Then, the data is combined to reorganize one data under control of the data dividing unit 14 of the DCU 5 and the reorganized data is transferred to the CPU 4.

When a failure occurs in one of the data drives 9 and data in the failed data drive is not read, for example, the data reconstructing unit 7 uses the data read from the normal data drives 8 and the ECC read from the ECC drive 9 to reconstruct data in the failed drive 8 and stores the reconstructed data in a corresponding portion of the data buffer 6.

The data drives 8 and the ECC drives 9 in the array disk unit 3 are rotated in synchronism with one another to perform parallel processing. Thus, the CPU 4 controls timing as if the CPU performs processing to a single disk drive.

Figure 4:
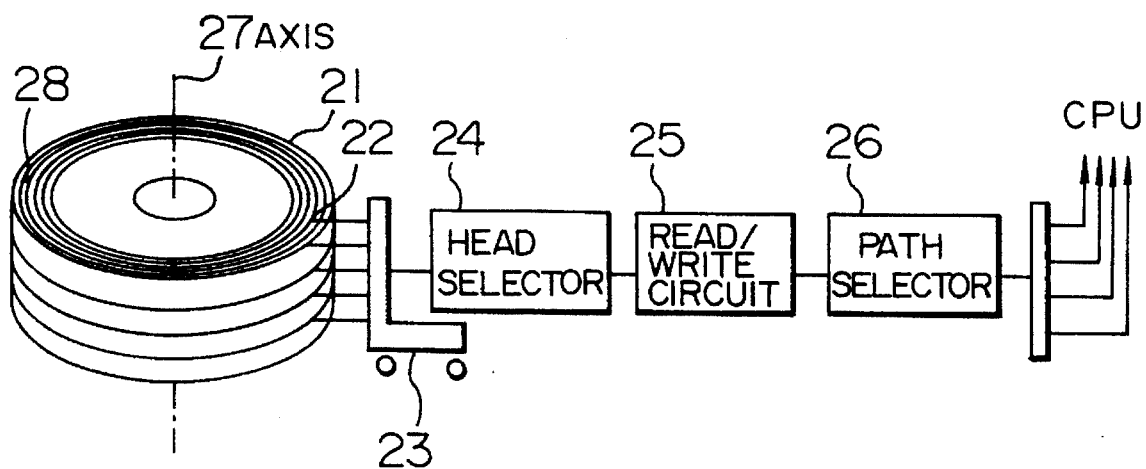
FIG. 4 is a diagram schematically illustrating a configuration of a disk drive.

FIG. 4 shows an internal structure of a disk drive used as the data drives 8 and the ECC drives 9.

Figure 5:
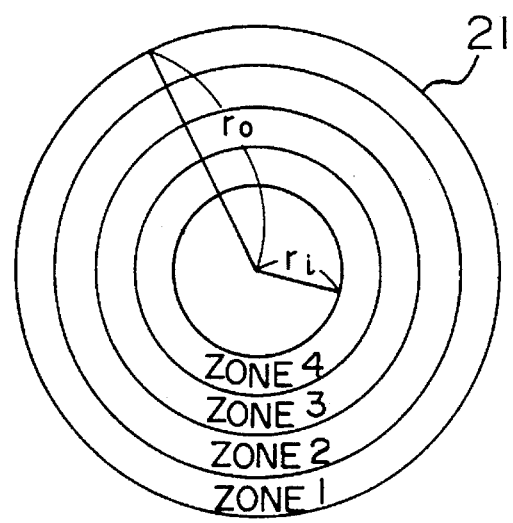
FIG. 5 shows a disk having divided zones.

The disk drive includes a plurality of disks 21 constituting recording media, which disks are to be rotated about one axis 27. Data is recorded in concentric tracks on the disks 21. In the embodiment, as shown in FIG. 5, the surface of the disk 21 is divided into four zones and the capacity of data capable of being recorded in the track 28 in each zone is varied, so that the recording density of data in all of the tracks 28 is adapted to be substantially identical.

Figure 6:
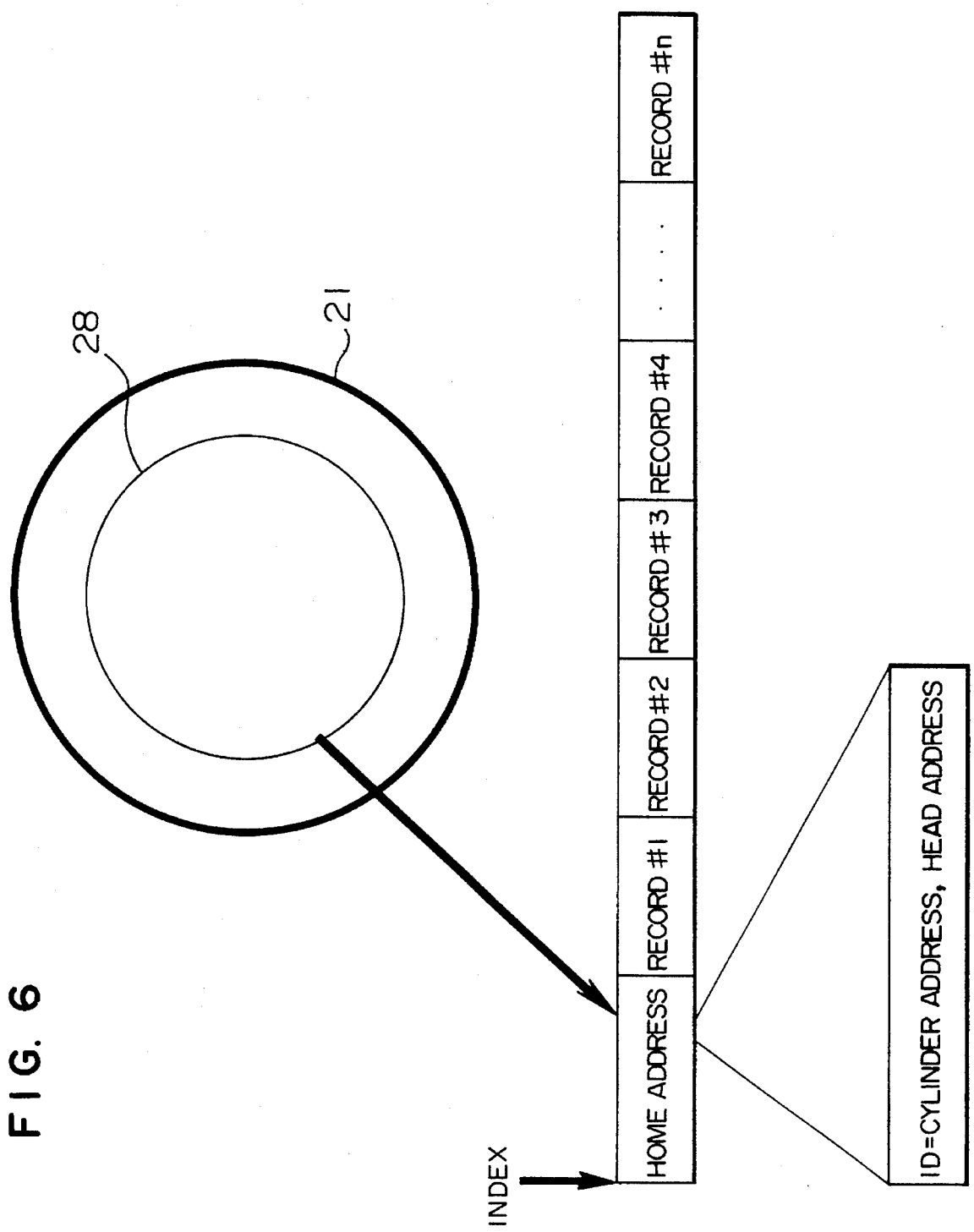
FIG. 6 shows a configuration of a track on a disk.

Reading/writing heads 22 for reading and writing data on the disks 21 are mounted to an actuator 23 and at least one reading/writing head 22 is provided for the data recording surface of one disk 21. The reading/writing heads 22 are positioned simultaneously for the tracks 23 on the disks 21 by means of the actuator 23. The positioning operation of the head is hereinafter referred to as the seek operation. A collection of tracks capable of being accessed by a single seek operation is referred to as a cylinder and a cylinder address is given to each of the cylinders. The cylinder address is recorded, as shown in FIG. 6, in a home address section on the track in which record information to the disk is recorded, together with a head address and the like.

When data is written in or read from the disk 21, the array disk controller 2 causes the command interpreting unit 12 to analyze the command from the CPU 4 and issues an access instruction to the disk drives 8 and 9 of the array disk unit 3. The disk drives 8 and 9 of the array disk unit 3 select the head corresponding to the head address designated by the access instruction by means of a head selector 24, and the seek operation to the track corresponding to the cylinder address is carried out by the actuator 23. Thereafter, a path selector 26 selects a path to the host system and reading/writing of data is performed by a reading/writing circuit 25.

In the embodiment, the data drives 8 of the array disk unit 3 are divided into two groups. A group 1 (data drives #1 and #2) has cylinder addresses given successively from the outer periphery toward the inner periphery of the disk 21 and a group 2 (data drives #3 and #4) has cylinder addresses given successively from the inner periphery toward the outer periphery of the disk 21. In the embodiment, there are provided two ECC drives, and the ECC drive #1 has cylinder addresses given in the same manner as in the data drives belonging to the group 1 and the ECC drive #2 has cylinder addresses given in the same manner as in the data drives belonging to the group 2.

Figure 7:
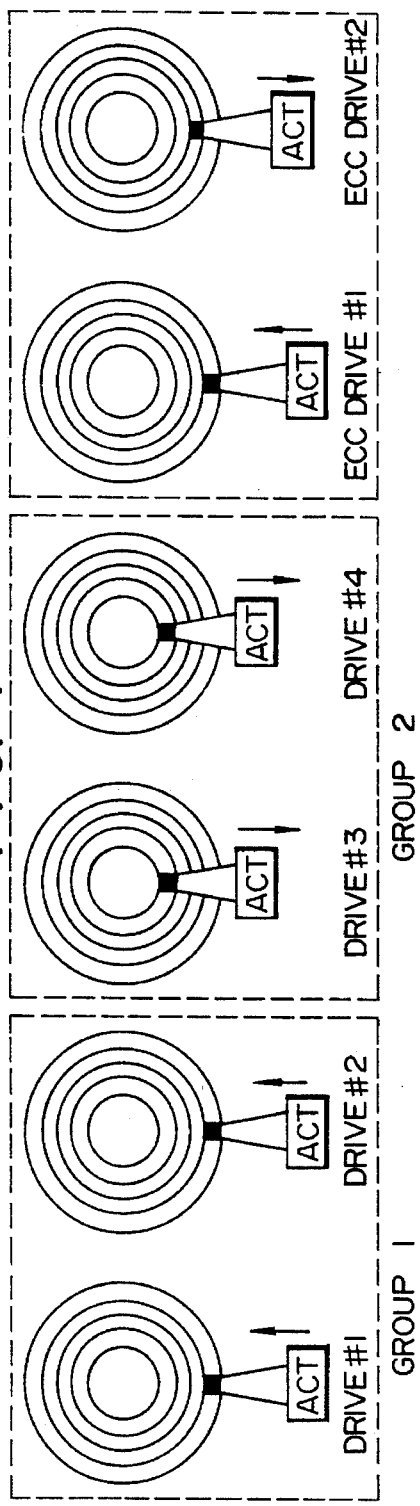
FIG. 7 schematically illustrates the state of access to the disk in the present invention.

With such a configuration, even when the DCU 5 issues an access instruction to the same cylinder address to the data drives 8 of the array disk unit 3, the zones accessed in the groups 1 and 2 can be different from each other. For example, as shown in FIG. 7, when the group 1 accesses the zone 1, the group 2 accesses the zone 4 (pattern 1), while when the group 1 accesses the zone 2, the group 2 accesses the zone 3 (pattern 2). Similarly, when the group 1 accesses the zone 3, the group 2 accesses the zone 2 (pattern 3), while when the group 1 accesses the zone 4, the group 2 accesses the zone 1 (pattern 4).

In this manner, when the zones accessed by the groups of the disk drives are varied, the data capacity in the track in each of the zones is described below.

When the data capacities of the track in the zones 1 to 4 are C1, C2, C3 and C4, respectively, the data capacity of the track in each of the zones is set so that C1+C4 is equal to C2+C3. When the data capacity of the track in each of the zones is set as described above, there is a relation of d1+d4=d2+d3 among amounts of data d1, d2, d3 and d4 capable of being read or written in a unit time (t) in the zones 1 to 4. Accordingly, as shown in FIG. 8, the amount of data capable of being read or written in the unit time in the patterns 1 to 4 can be made constant.

A method of dividing data in the embodiment is now described.

There are two patterns in the data division method of the embodiment as shown in FIG. 9. In the pattern 1, any one of the groups 1 and 2 accesses the track in the zone 1 and the remaining group accesses the track in the zone 4. In the pattern 2, any one of the groups 1 or 2 accesses the track in the zone 2 and the remaining group accesses the track in the zone 3.

In the data division, the command interpreting unit 12 of the DCU 5 judges whether the zone to be accessed is any of the pattern 1 or 2 on the basis of the cylinder address designated by the host system. The data dividing unit 14 divides the data transferred from the CPU 4 on the basis of this judgment.

Figure 10A:
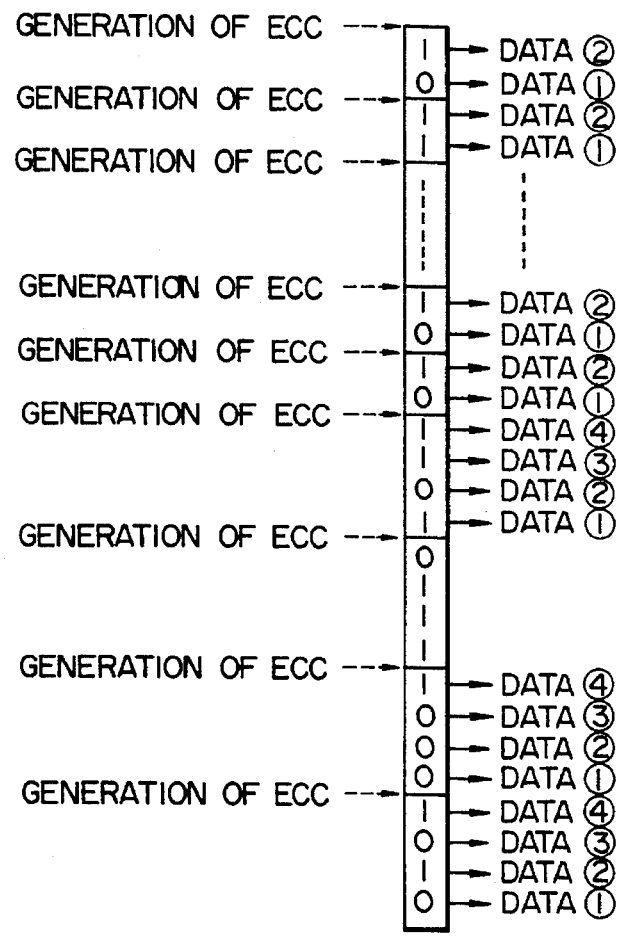
FIGS. 10A and 10B schematically illustrate distribution of data.

For example, when the data capacities C1, C2, C3 and C4 per track in the respective zones are 60, 50, 40 and 30 KB, respectively, a ratio of the amounts d1, d2, d3 and d4 of data capable of being read or written in the unit time in the respective zones is 6:5:4:3. The data transferred from the CPU 4 is divided in accordance with the ratio. In this case, when a write request of data of 90 KB is issued and the pattern 1 that writing is made to the zone 1 of the group 1 and the zone 2 of the group 2 is determined from the cylinder address designated by the host system, the data amount D1 written in the zones 1 of the group 1, that is, the data drives #1 and #2 is 30 KB and the data amount D4 written in the zones 4 of the group 2, that is, the data drives #3 and #4 is 15 KB. As shown in FIG. 10A, the data transferred from the host system is divided into data ①, ②, ③ and ④ in byte units under control of the data dividing unit 14 and is stored in the DB 6. At the same time, an ECC is generated by the ECC generator 15 and stored in the data buffer 6 similarly.

Figure 10B:
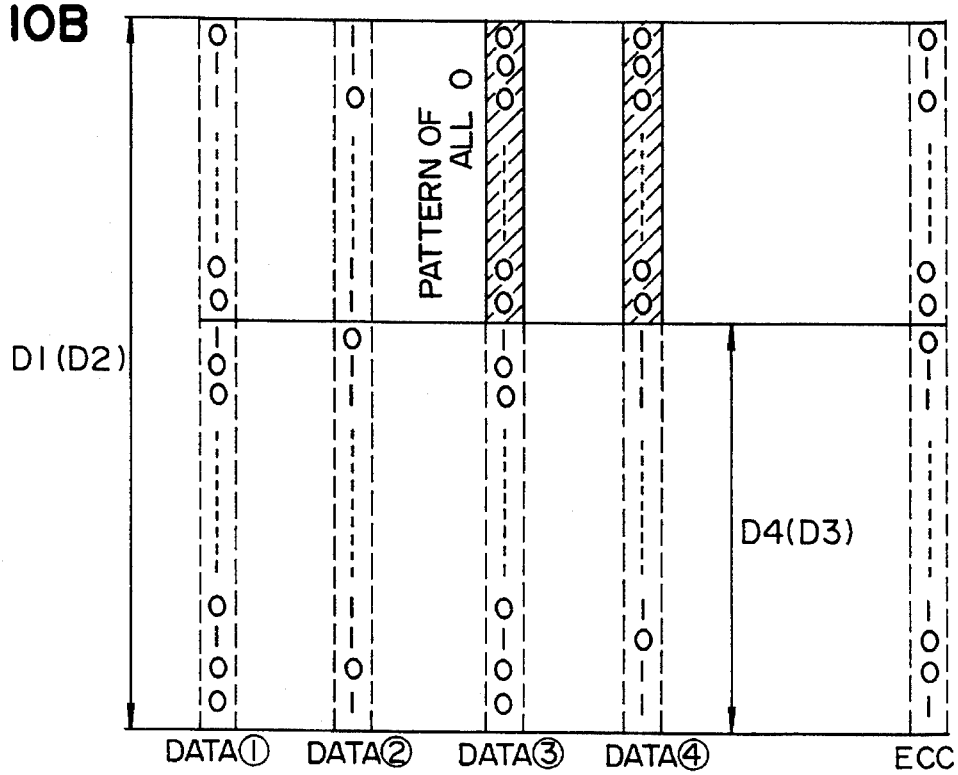

While the data is divided and stored in byte units as described above, when data divided into the data ③ and ④ reach 15 KB, respectively, as shown in FIG. 10B, division of data into the data ③ and ④ is stopped and remaining data is divided into only the data ① and ②.

When data is read from the array disk unit 3, data transferred from the array disk unit 3 in parallel is first stored in the data buffer 6 and data is combined by the data ①, ②, ③ and ④ in byte units in the data dividing unit 14 to be transferred to the CPU 4. After data of 15 KB is fed from the data ③ and ④, data is combined by only the data ① and ②.

Further, when data is written in the zone 4 of the group 1 and the zone 1 of the group 2, data transferred from the CPU 4 is divided into data ①, ②, ③ and ④ and stored in the data buffer 6 in the same manner as above. After data of 15 KB is divided into the data ① and ②, data is divided into only data ③ and ④. When data is read from the array disk unit 3, data transferred from the array disk unit 3 in parallel is combined by data ①, ②, ③ and ④ in byte units in the data buffer 6 and after data of 15 KB is fed from the data ① and ②, data is combined by only data ③ and ④.

When the method of data division is effected by using the pattern 2, the same processing as the pattern 1 is made. In this case, for example, when data is written in the zone 2 of the group 1 and the zone 3 of the group 2, data written in the zones 2 of the group 1, that is, the data drives #1 and #2 is 25 KB and data written in the zones 3 of the group 2, that is, the data drives #3 and #4 is 20 KB.

When an ECC as shown in FIG. 3 is generated for the data divided in the pattern 1 or 2 of FIG. 9, the length of the ECC is equal to the longest data of the divided data. That is, the data amount of the ECC as shown in FIG. 9 is equal to the data amount D1 written in the zone 1 for the pattern 1 and the data amount D2 written in the zone 2 for the pattern 2. When the ECC is generated, hatched portions of FIG. 9 are filled with a certain bit pattern, for example, a bit stream having all "0" as shown in FIG. 10B, with a bit length corresponding to the difference between D1 and D4 for the data division pattern 1 and the difference between D2 and D3 for the data division pattern 2. The ECC generator 15 serves to make the length of all divided data equal to the length of the longest data and to generate the ECC. The ECC thus generated is stored in the ECC drive 9.

In the embodiment, since the ECC is generated as described above, the amount of ECC generated is equal to the data amount D1 recorded in the zone 1 or the data amount D2 recorded in the zone 2. Thus, in order to store the ECCs at the same timing as that of storing the data, it is necessary to provide two ECC drives 9.

For example, when the group 1 accesses the zone 1 and the group 2 accesses the zone 4, the amount of ECC is equal to D1 and the ECC is written in the zone 1 of the ECC drive #1. Further, when the group 1 accesses the zone 2 and the group 2 accesses the zone 3, the amount of ECC is equal to D2 and the ECC is written in the zone 2 of the ECC drive #1. When the group 1 accesses the zone 3 and the group 2 accesses the zone 2, since the ECC drive #1 accesses the zone 3, the data capacity is lacking in order to write the ECC having the data amount D2. Thus, the drive for storing the ECC is switched to the ECC drive #2 and the ECC is written in the zone 2 of the ECC drive #2. Similarly, when the group 1 accesses the zone 4 and the group 2 accesses the zone 1, the ECC is written in the zone 1 of the ECC drive #2.

As described above, by setting the data capacity of the track in each zone and changing the zone accessed for each of the groups 1 and 2, the data amount capable of being processed at the same time can be always fixed regardless of the zone accessed by the drives as shown in FIG. 8.

In the embodiment, while there are provided four data drives 8 in the array disk unit 3, it is apparent that the array disk system of the present invention can be attained irrespective of the number of the data drives 8.

Further, in the embodiment, while two exclusive disk drives are provided as the ECC drives, it can reduced to only one disk drive for ECC by treating the access to the ECC drive independently of the access to the data drives.

In the first embodiment described above, the zones 3 and 4 of the ECC drive 9 are not used, resulting in a waste the recording area of the disk drive. Thus, a second embodiment in which the division method of data is changed to effectively utilize all of the recording area is now described.

Figure 11:
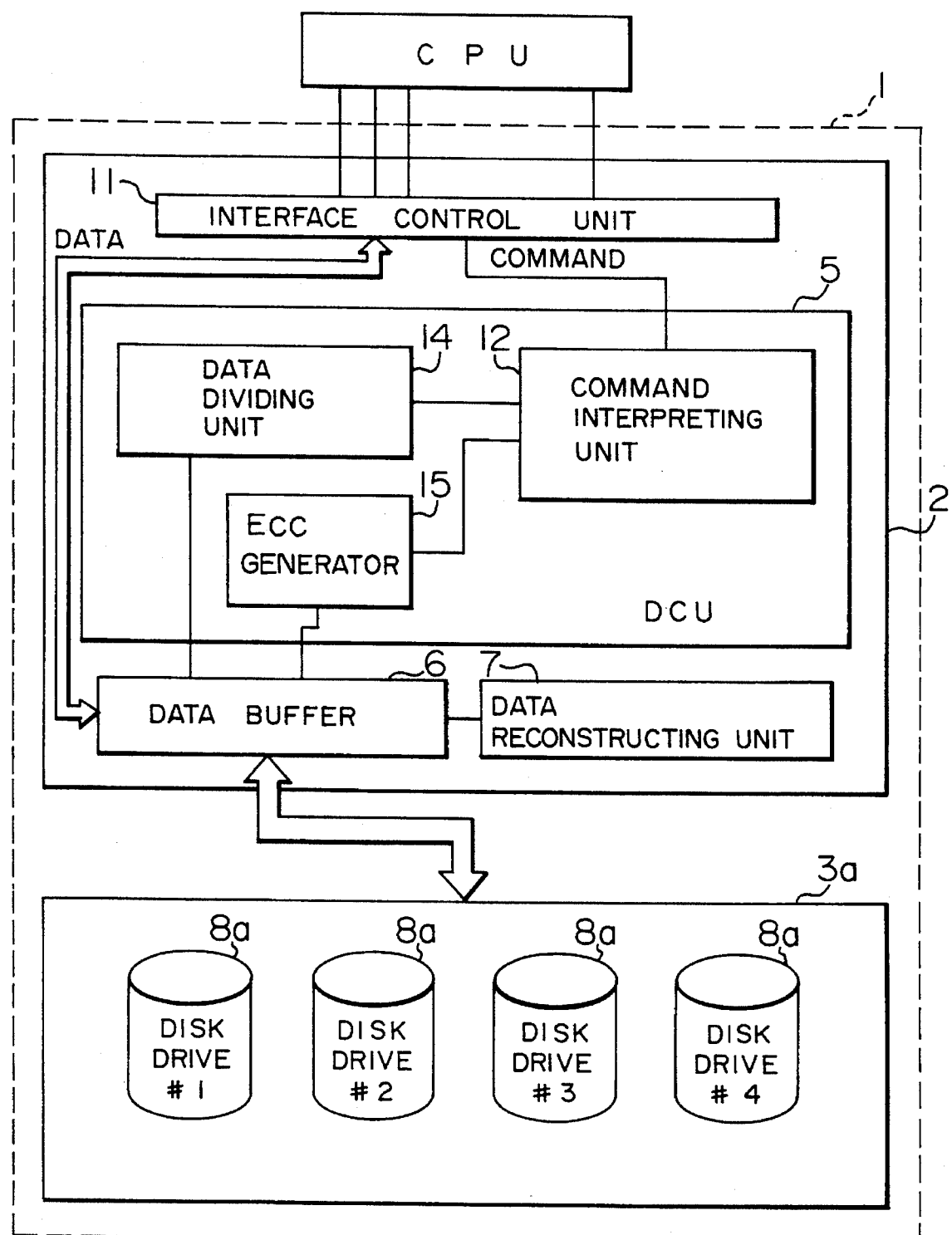
FIG. 11 is a block diagram showing a configuration of a second embodiment of the present invention.

FIG. 11 is a block diagram showing a configuration of the array disk system according to the second embodiment. The array disk system of FIG. 11 has the same configuration as that of the array disk system of FIG. 1 except that the ECC drive 9 for writing the ECC of the disk drives constituting the array disk unit is omitted. In the embodiment, part of disk drives 8a in an array disk unit 3a functions to store both data and the ECC, so that a useless area in which data (ECC) is not written is avoided in the disk drives, in contrast to the first embodiment.

Even in this embodiment, in the same manner as in the first embodiment described above, the disk drives 8a of the array disk unit 3a are divided into two groups, A group 1 (disk drives #1 and #2) has cylinder addresses given successively from the outer periphery toward the inner periphery of the disk and a group 2 (disk drives #3 and #4) has cylinder addresses given successively from the inner periphery toward the output periphery of the disk. In the embodiment, when the data capacities of the tracks of the zones 1 to 4 are C1, C2, C3 and C4, the data capacity of the track of each zone is set to satisfy the following relation:

$$C1+C4\times 2=C2+C3\times 2$$

Thus, at the array disk unit 3a, the data capacity capable of being processed in the same time can be fixed regardless of the position of the reading/writing head on the disk.

By setting the data capacity per track as described above, data transferred from the CPU 4 is divided into three data in accordance with two patterns as shown in FIG. 12.

Figure 12A:
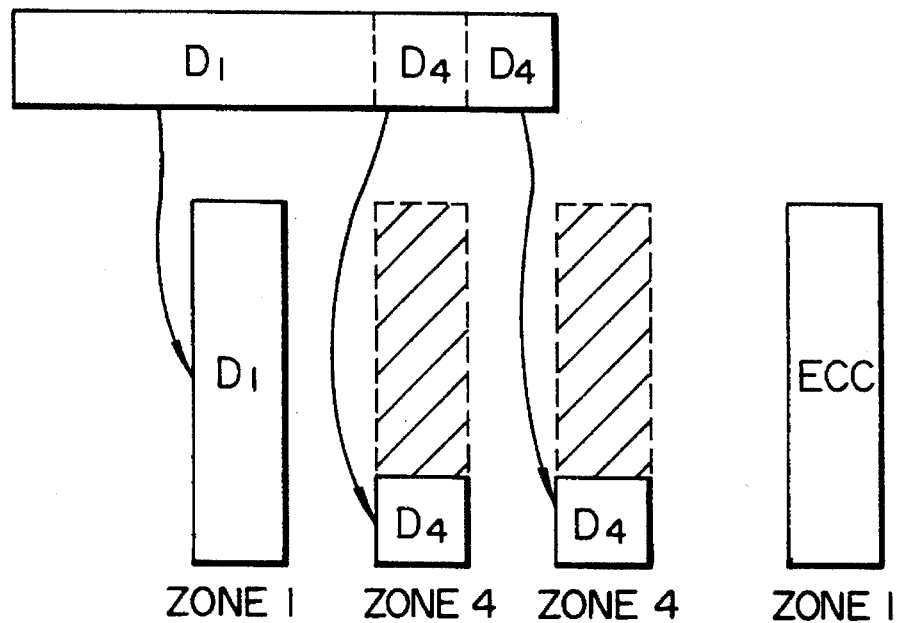
FIGS. 12A and 12B schematically illustrate division patterns of data in the second embodiment.
Figure 12B:
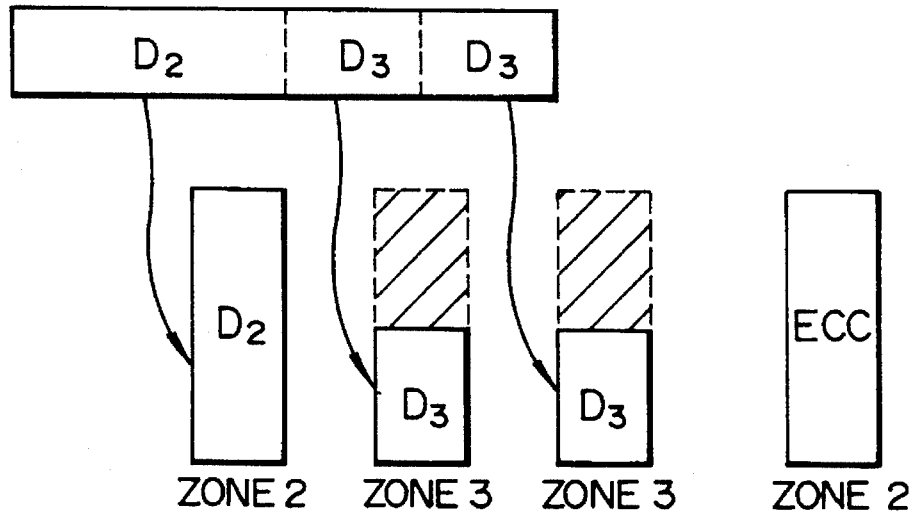

When an ECC is prepared for the data divided into three in accordance with the two patterns as shown in FIGS. 12A and 12B by the same method as in the first embodiment, the data amount of the ECC is equal to the amount of the largest data of the divided data. That is, when data is divided in accordance with the pattern 1, the data amount of the ECC is equal to D1 and when data is divided in accordance with the pattern 2, the data amount of the ECC is equal to D2. The ECC generator 15 fills the hatched portions of FIG. 12, that is, a difference portion between D1 and D4 for the pattern 1 and a difference portion between D2 and D3 for the pattern 2, with a particular bit pattern, for example, a bit pattern of all "0" bits to make equal the length of all of the divided data.

The access state of the disk drives 8a of the array disk unit 3a is shown in FIGS. 13A and B. The writing operation for data and the ECC in each state is now described with reference to FIG. 13.

In the state 1 shown in FIG. 13A, the reading/writing heads 22 for the disk drives #1 and #2 are positioned in the zone 1 and the reading/writing heads 22 for the disk drives #3 and #4 are positioned in the zone 4. The division of data in this state is carried out in accordance with the pattern 1 of FIG. 12. Of the three divided data, data having data amount D1 is written in the zone 1 of the disk drive #1, and data having data amount D4 is written in the respective zones 4 of the disk drives #3 and #4. The amount of the ECC generated at this time is equal to D1 and the ECC is written in the zone of the disk drive #2.

In the state 2 shown in FIG. 13A, the reading/writing heads 22 for the disk drives #1 and #2 are positioned in the zone 2, and the reading/writing heads 22 for the disk drives #3 and #4 are positioned in the zone 3. In this case, data is divided in accordance with the pattern 2 of FIG. 12. Of the divided data, data having a data amount of D2 is written in the zone 2 of the disk drive #1 and data having a data amount of D3 is written in the respective zones 3 of the disk drives #3 and #4. The data amount of the ECC generated at this time is equal to D2 and the ECC is written in the zone 2 of the disk drive #2.

On the other hand, as shown in the state 3 of FIG. 13B, when the reading/writing heads for the disk drives #1 and #2 are positioned in the zone 4 and the reading/writing heads 22 for the disk drives #3 and #4 are positioned in the zone 1, data transferred from the CPU 4 is divided in accordance with the pattern 1 of FIG. 12. Of the divided data, data having a data amount of D1 is written in the zone 1 of the disk drive #4 and data having a data amount of D4 is written in the zone 4 of the disk drives #1 and #2. The data amount of the ECC generated at this time by the ECC generator 15 is equal to D1 and the ECC is written in the zone 1 of the disk drive #3. In the states 1 and 2 shown in FIG. 13A, the disk drive #2 in which the ECC is written is the disk drive for writing data in the state 3 shown in FIG. 13B and in the state 4 described below. Further, the disk drive #3 for writing data in the states 1 and 2 shown in FIG. 13A is the disk drive for writing ECC in the states 3 and 4 shown in FIG. 13B.

In the state 4 of FIG. 13B, the reading/writing heads 22 for the disk drives #1 and #2 are positioned in the zone 3 and the reading/writing heads 22 for the disk drives #3 and #4 are positioned in the zone 2. In this case, data transferred from the CPU 4 is divided in accordance with the pattern 2 of FIG. 12. Of the divided data, data having a data amount of D2 is written in the zone 2 of the disk drive #4 and data having a data amount of D3 is written in the respective zones of the disk drives #1 and #2. The data amount of the ECC generated at this time by the ECC generator 15 is equal to D2 and the ECC is written in the zone 2 of the disk drive #3.

As described above, in the embodiment, the disk drive in which the ECC is written is not fixed and is varied dynamically with movement of the reading/writing head.

In the first embodiment, only the zones 1 and 2 of the ECC drive 9 are used, and data and the ECC are not both recorded in the zones 3 and 4 of the ECC drive 9, which are useless areas. However, in the second embodiment, the disk drive in which the ECC is written is not fixed and an area for the ECC is provided in part of the disk drives for data, so that the disk drive in which the ECC is written is varied dynamically and all zones can be used.

It is apparent that the second embodiment can attain the same effects as the first embodiment. Further, there is no limitation on the dividing method of the groups and the number of disk drives constituting the array disk unit.

Still another embodiment of the present invention now will be described.

Figure 14:
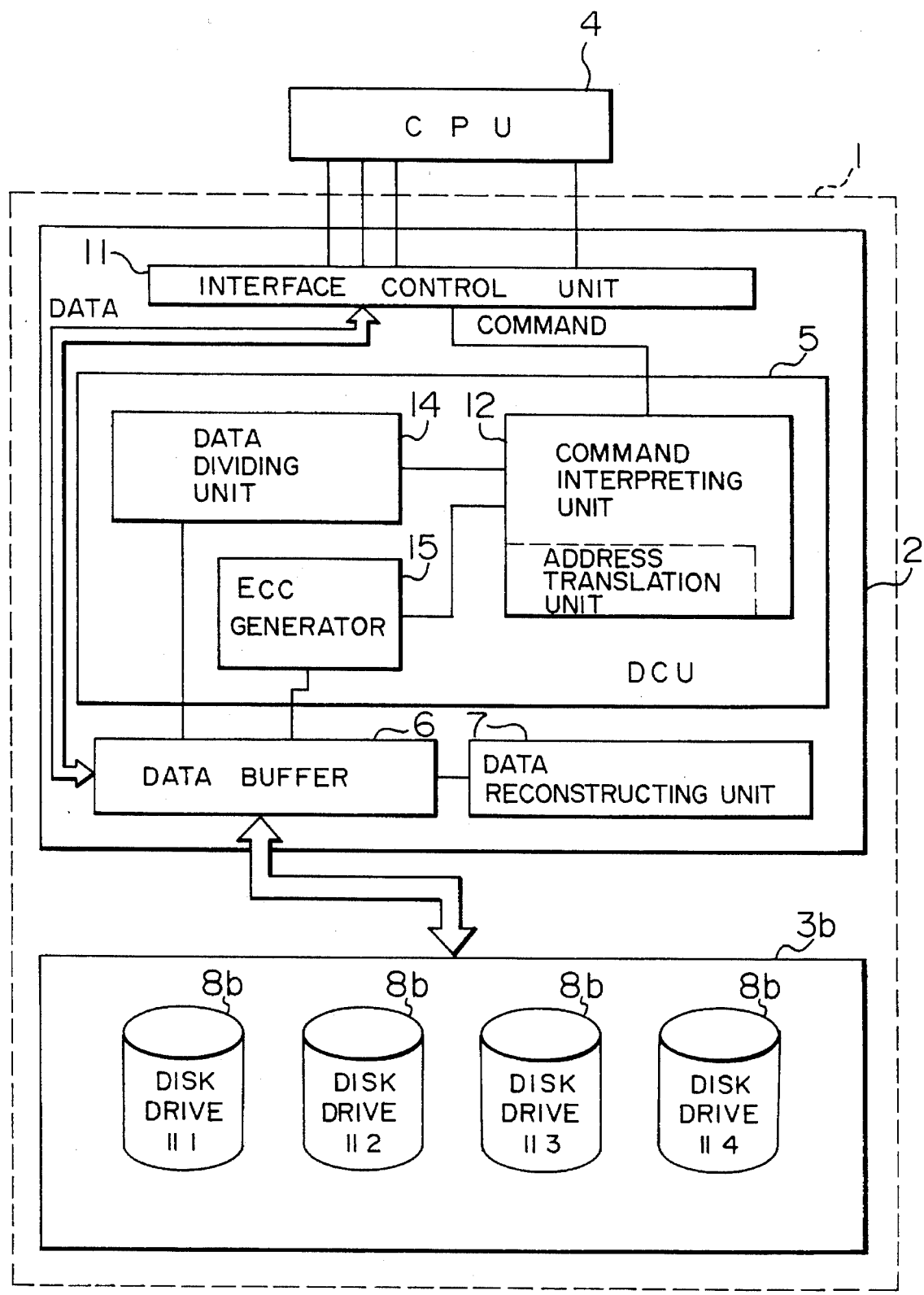
FIG. 14 is a block diagram showing a configuration of a third embodiment of the present invention.
Figure 15A:
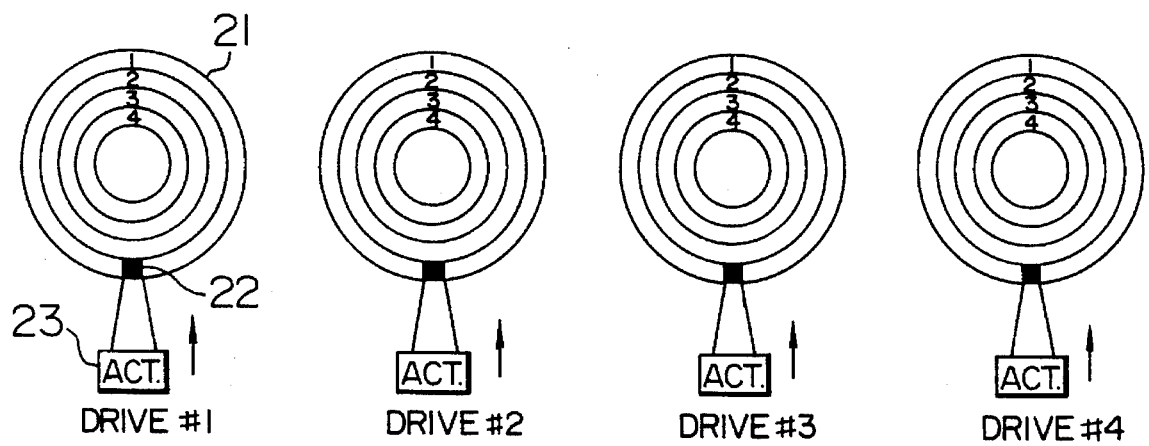
FIGS. 15A and 15B schematically illustrate a problem occurring when the disk drives having the data capacity per track being varied for each zone of the disks is applied to an array disk system.
Figure 15B:
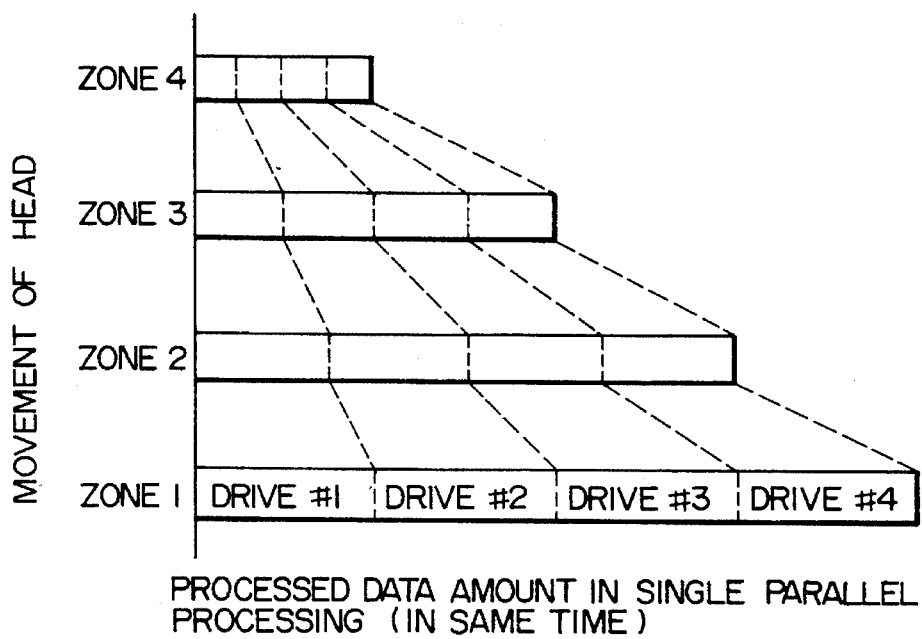

In the first and second embodiments described above, the DCU 5 instructs the same cylinder address to each of the disk drives of the array disk unit without being conscious of the zone (cylinder) accessed actually by the disk drive of the disk unit and changes the cylinder address for each group of the disk drive to access a different cylinder. Accordingly, in the first and second embodiments, it can be said that translation of the cylinder address is made in the array disk unit. In contrast therewith, in the third embodiment, the address translation is made in the DCU 5 and the command interpreting unit 12 of the DCU 5 includes an address translation unit 13 as shown in FIG. 14. Further, the cylinder addresses of all of the disk drives 8b constituting array disk unit 3b are set to be identical physically. For example, the cylinder addresses are given to all of the disk drives successively from the outer periphery toward the inner periphery of the disk.

In the embodiment, the disk drives of the array disk unit 3b are divided into two groups in the same manner as the second embodiment. When the array disk unit 3b is accessed, the command interpreting unit 12 analyzes the command from the CPU 4 and causes the address translation unit 13 to translate the cylinder address transferred from the CPU 4 for each group of the disk drives. An access instruction is issued so that the zone is varied for each zone of the disk drive and accessed.

The address translation in the address translation unit 13 is performed, for example, as follows. It is assumed that the cylinder addresses of 0 to 1000 are given from the outer periphery to the inner periphery on the disk of the disk drives.

When the access instruction to the cylinder address X is issued to the array disk system 1 from the CPU 4, address translation is performed on the basis of the cylinder address of the group 1 in the address translation unit 13 of the DCU 5. That is, the cylinder address of the group 1 is caused to coincide with the cylinder address designated from the CPU 4 to effect the address translation. Accordingly, the address translation unit 13 obtains the cylinder address X as the cylinder address of the group 1 as it is. On the other hand, the cylinder address of the group 2 is obtained by subtracting the cylinder address transferred from the CPU 4 from 1000, i.e. the maximum value of the cylinder address. Thus, the address translation unit 13 obtains 1000−X as the cylinder address of the group 2.

The command interpreting unit 12 uses the cylinder address thus translated to issue the access instruction to the groups 1 and 2. Thus, the access instruction having the cylinder address X is issued to the disk drive 8b belonging to the group 1 and the access instruction having the cylinder address 1000×X is issued to the disk drive 8b belonging to the group 2, so that both of the groups can access the different zones on the disk.

Even in the embodiment, division of data written in the disk drives 8b of the array disk unit 3b and generation and writing of the ECC are carried out in the same manner as the second embodiment described above.

In the embodiment, the four disk drives are provided in the array disk unit 3 and the ECC drive for exclusive use of the ECC is not provided, while it is apparent that the ECC drives for use in only writing of the ECC can be provided and the disk drives can be divided into those for data and those for the ECC. In this case, the address translation is provided even for the ECC drives in the same manner as the data drives and the access instruction is issued.

As described above, according to the present invention, the surface on the disk of the disk drives constituting the array disk system is divided into a plurality of zones and even when the disk drives having varied data capacity per track in each zone are used, an amount of data capable of being processed at the same time can be made uniform in the whole array disk unit. Accordingly, the possibility that the processing performance will be varied extremely by the cylinder address designated by the host system can be prevented.

We claim:

1. An array disk system comprising:

a plurality of disk drives, each including recording media having a plurality of tracks disposed concentrically and on which data is recorded, and further including reading/writing heads for reading and writing data onto said recording media, said recording media each having a surface divided into a plurality of concentric zones, the data capacity per track in each zone being different from the data capacity per track of each of the other zones of said plurality of zones;

means for providing input and output requests for effecting communication of input and output data, respectively, between a host system and said plurality of disk drives;

means for decoding input and output requests received from the host system for positioning said reading/writing heads to the tracks of different zones for each disk drive or for each group of said disk drives on the basis of a cylinder address designated by the host system;

means for dividing data transferred from the host system into a plurality of data portions in accordance with an output request from the host system to write said plurality of divided data portions in said plurality of disk drives simultaneously;

means for reading a plurality of data portions from said plurality of disk drives simultaneously in accordance with an input request from the host system to reproduce data to be transferred to the host system;

means for generating an error correction code of the same data length as the data portion having the longest data length, and for filling the difference between the length of the data portion and the length of the longest data portion with data comprising a bit having a predetermined value for generating said error correction code; and means for reading/writing the generated error correction code onto one of said recording media.

2. An array disk system according to claim 1, wherein said plurality of disk drives in which data is recorded include a disk drive in which said error correction code is recorded.

3. A method of controlling an array disk system including a plurality of disk drives, each of the disk drives having recording media thereon, each of the recording media having a surface divided into a plurality of concentric zones, the data capacity per track in each zone being different from the data capacity per track in each of the others of said plurality of zones, recording or reproducing of data being effected simultaneously for each of said disk drives, said method comprising the steps of:

dividing said plurality of disk drives into a plurality of groups;

receiving input and output requests and data to be written from a host system;

decoding input and output requests received from the host system and positioning respective reading/writing heads for said disk drives to respective tracks in different zones in each group of the divided disk drives in response to a cylinder address designated by the host system;

dividing data transferred from the host system into a plurality of data portions;

writing said divided data portions in a related plurality of said plurality of disk drives simultaneously;

generating an error correction code of the same length as the data portion having the longest data length of the data portions;

writing said error correction code into a disk drive of said plurality of disk drives; and filling a difference between the length of the data portion and the length of the longest data portion, for each of said data portions, with data comprising a bit having a predetermined bit value.

4. A control method of an array disk system according to claim 3, wherein said writing of said error correction code is made simultaneously with writing of said plurality of data portions.

5. An array disk system, comprising:

(a) a plurality of disk drives, each including recording/media having a plurality of concentrically disposed tracks for recording signals thereon, said tracks of each disk drive being divided into a plurality of concentric zones, the data capacity per track in each zone being different from the data capacity per track of each of the other zones, the plurality of tracks of said plurality of disk drives being divided into a plurality of track groups, each track group including a plurality of tracks belonging to different ones of said plurality of disk drives, the plurality of tracks of each track group including a plurality of data recording tracks for recording data thereon and at least one error correction code signal recording track for recording an error correction code signal thereon, at least one of the plurality of tracks of each track group belonging to one of the zones different from the zone to which each of the others of said plurality of tracks belongs, at least one error correction code signal recording track of each track group having a signal capacity dependent upon the data capacities of the plurality of data recording tracks of said each track group;

(b) an execution circuit responsive to a data write request provided by a host system for selecting one of said plurality of track groups;

(c) a data dividing unit responsive to the data write request for dividing write data received from the host system into a plurality of data portions having data lengths dependent upon ratios of data capacities of the plurality of data recording tracks belonging to said selected track group; and (d) an error correction code signal generator responsive to said plurality of data portions for generating an error correction code signal therefor, the length of the error correction code signal depending upon the lengths of the plurality of data portions;

(e) said execution circuit writing said plurality of data portions onto plural data recording tracks included in said selected track group and writing said generated error correction code signal into an error correction code signal recording track included in said selected track group.

6. An array disk system according to claim 5, wherein the data capacity of an error correction code signal recording track included in each track group is substantially equal to the maximum data capacity of the data capacities of the plurality of data recording tracks included in said each track group.

7. An array disk system according to claim 5, wherein the sum of data capacities of the plurality of data recording tracks included in each of said plurality of track groups is substantially equal to the sums of data capacities of the pluralities of data recording tracks included in each of the others of said plurality of track groups.

8. An array disk system according to claim 5 wherein the length of the generated error correction code signal is dependent on the longest length of the lengths of said plurality of data portions.

9. An array disk system according to claim 8, wherein the length of the generated error correction code signal is equal to the longest length of the lengths of said plurality of data portions.

10. An array disk system according to claim 5, wherein:

said plurality of disk drives includes a plurality (N) of pairs of data recording disk drives and a pair of error correction code signal recording disk drives;

a plurality of data recording tracks included in each track group comprises a plurality (N) of pairs of data recording tracks provided in different ones of said plurality (N) of pairs of data recording disk drives; and an error correction code signal recording track included in said each track group is included in one of said pair of error correction code signal recording disk drives.

11. An array disk system according to claim 10, wherein:

the sum of data capacities of the plurality of data recording tracks included in each of said plurality of track groups is substantially equal to the sum of data capacities of the pluralities of data recording tracks included on each of the others of said plurality of track groups; and the data capacity of an error correction code signal recording track included in each track group is substantially equal to the maximum data capacity of the data capacities of the plurality of data recording tracks included in said each track group.

12. An array disk system according to claim 5, wherein at least some of said plurality of disk drives include a number of data recording tracks and a number of error correction code signal recording tracks.

13. An array disk system according to claim 12, wherein:

the sum of data capacities of the plurality of data recording tracks included in each of said plurality of track groups is substantially equal to the sums of data capacities of the plurality of data recording tracks included in each of the others of said plurality of track groups; and the data capacity of an error correction code signal recording track included in each track group is substantially equal to the maximum data capacity of the data capacities of the plurality of data recording tracks included in said each track group.

* * * * *